(12) United States Patent
Ek et al.

(10) Patent No.: US 10,087,296 B2
(45) Date of Patent: Oct. 2, 2018

(54) METHOD OF PRODUCING A CABLE COMPRISING A MULTIMODAL ETHYLENE COPOLYMER

(71) Applicant: BOREALIS AG, Vienna (AT)

(72) Inventors: Carl-Gustav Ek, Vastra Frolunda (SE); Anneli Pakkanen, Vasterskog (FI); Albrecht Dix, Linz (AT); Thomas Steffl, Stenungsund (SE); Andrey Buryak, Linz (AT)

(73) Assignee: BOREAUS AG, Vienna (AT)

( * ) Notice: Subject to any disclaimer, the term of this patent is extended or adjusted under 35 U.S.C. 154(b) by 0 days.

(21) Appl. No.: 14/931,398

(22) Filed: Nov. 3, 2015

(65) Prior Publication Data

US 2016/0060411 A1 Mar. 3, 2016

Related U.S. Application Data

(63) Continuation of application No. 13/126,987, filed as application No. PCT/EP2009/063252 on Oct. 12, 2009, now abandoned.

(30) Foreign Application Priority Data

Oct. 31, 2008 (EP) .................................... 08168051

(51) Int. Cl.
*H01B 13/14* (2006.01)
*C08J 7/04* (2006.01)
(Continued)

(52) U.S. Cl.
CPC ............. *C08J 7/047* (2013.01); *C08F 210/16* (2013.01); *C08L 23/06* (2013.01); *C08L 23/0815* (2013.01); *B05D 1/265* (2013.01); *B05D 7/20* (2013.01); *B05D 7/50* (2013.01); *C08F 4/65912* (2013.01); *C08J 2323/08* (2013.01);
(Continued)

(58) Field of Classification Search
USPC .................................................. 427/117–120
See application file for complete search history.

(56) References Cited

U.S. PATENT DOCUMENTS

| 3,242,150 A | 3/1966 | Scoggin |
| 3,324,093 A | 6/1967 | Alleman |

(Continued)

FOREIGN PATENT DOCUMENTS

| EP | 0188125 A2 | 7/1986 |
| EP | 0250169 A2 | 12/1987 |

(Continued)

OTHER PUBLICATIONS

International Search Report and Written Opinion for PCT/EP2009/063252 dated Feb. 4, 2010.

(Continued)

*Primary Examiner* — Brian K Talbot
(74) *Attorney, Agent, or Firm* — Meunier Carlin & Curfman LLC (57) ABSTRACT

The present invention relates to a cable comprising a conductor surrounded by one or more layers, wherein at least one layer comprises a polymer composition comprising a copolymer of ethylene with one or more comonomers, to a process for producing the cable and to a polymer composition suitable as a cable layer material.

11 Claims, 1 Drawing Sheet

(51) Int. Cl.
*C08F 210/16* (2006.01)
*C08L 23/06* (2006.01)
*C08L 23/08* (2006.01)
*B05D 1/26* (2006.01)
*B05D 7/20* (2006.01)
*B05D 7/00* (2006.01)
*H01B 13/24* (2006.01)
*C08F 4/659* (2006.01)

(52) U.S. Cl.
CPC ..... *C08L 2203/202* (2013.01); *C08L 2205/02* (2013.01); *H01B 13/14* (2013.01); *H01B 13/141* (2013.01); *H01B 13/24* (2013.01)

(56) References Cited

U.S. PATENT DOCUMENTS

| | | | |
|---|---|---|---|
| 3,374,211 | A | 3/1968 | Marwil et al. |
| 3,405,109 | A | 10/1968 | Rohlfing |
| 4,532,311 | A | 7/1985 | Fulks et al. |
| 4,543,399 | A | 9/1985 | Jenkins et al. |
| 4,578,879 | A | 4/1986 | Yokoyama et al. |
| 4,582,816 | A | 4/1986 | Miro |
| 4,621,952 | A | 11/1986 | Aronson |
| 4,803,251 | A | 2/1989 | Goode et al. |
| 4,855,370 | A | 8/1989 | Chirillo et al. |
| 4,933,149 | A | 6/1990 | Rhee et al. |
| 5,026,795 | A | 6/1991 | Hogan |
| 5,391,654 | A | 2/1995 | Ahvenainen et al. |
| 5,718,974 | A * | 2/1998 | Kmiec ................ C08L 23/0815 174/113 R |
| 6,441,309 | B1 * | 8/2002 | Jow ....................... H01B 3/441 174/110 PM |
| 6,797,886 | B1 * | 9/2004 | Gustafsson ............ H01B 3/441 174/110 R |
| 7,105,749 | B2 | 9/2006 | Belli et al. |
| 2004/0024138 | A1 | 2/2004 | Allermann |
| 2004/0213527 | A1 | 10/2004 | Martinsson |
| 2007/0049711 | A1 | 3/2007 | Kuo et al. |
| 2008/0196922 | A1 * | 8/2008 | Van Marion ............ C08F 10/02 174/110 PM |
| 2008/0308296 | A1 | 12/2008 | Smedberg et al. |
| 2008/0312380 | A1 | 12/2008 | Kwalk et al. |
| 2009/0099315 | A1 * | 4/2009 | Kipke ..................... C08L 23/04 525/240 |
| 2010/0093953 | A1 * | 4/2010 | Kolling ................. B01J 31/143 526/96 |

FOREIGN PATENT DOCUMENTS

| | | |
|---|---|---|
| EP | 0369436 A2 | 5/1990 |
| EP | 0479186 A2 | 4/1992 |
| EP | 0499759 A1 | 8/1992 |
| EP | 0503791 A1 | 9/1992 |
| EP | 0560035 A1 | 9/1993 |
| EP | 0579426 A1 | 1/1994 |
| EP | 0600414 A1 | 6/1994 |
| EP | 0721798 A2 | 7/1996 |
| EP | 0699213 B1 | 2/1998 |
| EP | 0684871 B1 | 5/1998 |
| EP | 0707513 B1 | 9/1998 |
| EP | 0881237 A1 | 12/1998 |
| EP | 0891990 A2 | 1/1999 |
| EP | 0782587 B1 | 2/1999 |
| EP | 0696293 B1 | 5/2000 |
| EP | 1310295 A1 | 5/2003 |
| EP | 1415999 A1 | 5/2004 |
| EP | 1591459 A1 | 11/2005 |
| EP | 1591460 A1 | 11/2005 |
| EP | 1600276 A1 | 11/2005 |
| EP | 1634913 A1 | 3/2006 |
| EP | 1739103 A1 | 1/2007 |
| EP | 1739110 A1 | 1/2007 |
| EP | 1752462 A1 | 2/2007 |
| EP | 1527112 B1 | 10/2007 |
| EP | 1539775 B1 | 1/2008 |
| EP | 1633466 B1 | 3/2010 |
| WO | WO1992012182 | 7/1992 |
| WO | WO1994025495 | 11/1994 |
| WO | WO1996018662 | 6/1996 |
| WO | WO1997028170 | 8/1997 |
| WO | WO1997049764 | 12/1997 |
| WO | WO1997050093 | 12/1997 |
| WO | WO1998015591 | 4/1998 |
| WO | WO1998032776 | 7/1998 |
| WO | WO1999003902 | 1/1999 |
| WO | WO1999061489 | 12/1999 |
| WO | WO2000022040 | 4/2000 |
| WO | WO2000026258 | 5/2000 |
| WO | WO2000029452 | 5/2000 |
| WO | WO2001003147 A1 | 1/2001 |
| WO | WO2001005845 A1 | 1/2001 |
| WO | WO2003010208 A1 | 2/2003 |
| WO | WO2003051514 A1 | 6/2003 |
| WO | WO2003051934 A2 | 6/2003 |
| WO | WO2004085499 A2 | 10/2004 |
| WO | WO2005002744 A1 | 1/2005 |
| WO | WO2005087361 A1 | 9/2005 |
| WO | WO 2006/089394 * | 8/2006 |
| WO | WO2007025640 A1 | 3/2007 |

OTHER PUBLICATIONS

Office Action dated Jul. 21, 2015 in Korean Application No. 10-2011-7012429.

Henerson et al. "Ethylene-Vinyl Acetate (EVA) Copolymers: A General Review." IEEE Electrical Insulation Magazine, 1993, 9(1), 30-38.

* cited by examiner

METHOD OF PRODUCING A CABLE COMPRISING A MULTIMODAL ETHYLENE COPOLYMER

TECHNICAL FILED

The present invention is directed to a cable surrounded by at least one layer comprising a multimodal copolymer of ethylene, to a preparation process thereof, to a polymer composition comprising a multimodal copolymer of ethylene, as well as to a use thereof for producing a cable layer.

BACKGROUND ART

A typical electric cable generally comprises a conductor that is surrounded by one or more layers depending on the application area. E.g. power cable has several layers of polymeric materials including an inner semiconducting layer, followed by an insulating layer, and then an outer semiconducting layer. To these layers, one or more further auxiliary layer(s) may be added. The outer protecting polymeric layer is known i.a. as a jacketing layer. Any of the layers can be crosslinked as well known in the field.

One of the targets in polymer, i.a. polyethylene (PE) polymer, development has been to combine i.a. high flexibility while maintaining other useful mechanical properties. For instance desired mechanical properties in wire and cable (W&C) applications, e.g. in linear low density polyethylene (LLDPE) jacketing layer applications, include i.a. abrasion resistance.

Multimodal PE provides one way of tailoring the polymer properties. Moreover, e.g. single site catalyst (SSC) offers a controlled incorporation of comonomers which provides a further means for tailoring the polymer. However one of the major problems of PE produced using SSC is often the processability of the polymers.

There is a continuous need in the polymer field to find polymers which are suitable for demanding polymer applications, particularly for W&C applications, where the cable materials must meet high requirements and stringent authority regulations.

OBJECTS OF THE INVENTION

One of the objects of the present invention is to provide an alternative cable with one or more layer(s) wherein at least one layer contains a polyethylene polymer composition with good processability, including good extrusion performance, which preferably provides an advantageous surface smoothness to the obtained layer, and advantageous mechanical properties. Also a preparation process of said cable is provided.

A further object of the invention is to provide a polymer composition which comprises a polyethylene polymer having excellent mechanical properties combined with advantageous processing properties. Moreover a preparation method and use thereof in a cable layer is provided.

SUMMARY OF THE INVENTION

Accordingly, the invention is directed to a cable comprising a conductor surrounded by one or more layers, wherein at least one layer comprises a polymer composition comprising a copolymer of ethylene with one or more comonomer(s), wherein the ethylene copolymer
has a density of less than 945 kg/m$^3$ and a Mz/Mw of at least 2.45,
and wherein the ethylene copolymer
is obtainable by polymerising ethylene in the presence of a single site catalyst and an activator for said catalyst.

The combination of "a single site catalyst and activator for said catalyst" is also referred herein shortly as a single site catalyst, as evident for a skilled person.

The cable of the invention, which is referred herein as Cable, has surprisingly good processing properties in terms of extrudability resulting desirable surface smoothness of the obtained extruded cable layer. The surface smoothness is believed to be contributed by a decreased melt fracture behaviour during the preparation of the cable layer.

The "polymer composition of the invention" is referred herein as the Polymer composition and the "copolymer of ethylene with one or more comonomer(s) of the invention" is referred herein interchangeably as PE copolymer or shortly as PE copolymer.

Without limiting to any theory it is believed that the increased Mz value and thus high Mz/Mw value of the PE copolymer contributes to the advantageous processability of the Polymer composition and the surface properties of the obtained Cable layer thereof. The high Mz/Mw indicates that the molecular weight distribution is broadened and particularly is broadened due to presence of a very high weight average molecular weight fraction in the PE copolymer. In a preferably embodiment also the mechanical properties are improved, such as flexibility and/or abrasion resistance.

The term "conductor" means herein above and below that the conductor comprises one or more wires. Moreover, the cable may comprise one or more such conductors. Preferably the conductor is an electrical conductor.

"Cable" covers all type of wires and cables used in the wire and cable (W&C) applications.

The said at least one layer of the Cable comprising the Polymer composition is preferably a jacketing layer. The cable may comprise two or more layers comprising the Polymer composition.

The invention is also directed to a process for producing said Cable, comprising steps of applying, preferably by (co)extrusion, one or more layers on a conductor, which layers comprise a polymer, wherein at least one layer comprises said polymer composition of the invention.

The Polymer composition is highly feasible for use as a cable layer, preferably at least a jacketing layer. As a subgroup falling under the suitable Polymer composition for use in the Cable as defined above, the invention further provides independently a Polymer composition (Pc') which comprises the PE copolymer, wherein the ethylene copolymer has a density of less than 945 kg/m$^3$, a Mz/Mw of at least 2.45, wherein the ethylene copolymer is obtainable by polymerising ethylene in the presence of a single site catalyst and an activator for said catalyst and, additionally, wherein the ethylene copolymer has
an MFR$_2$ of 0.2 to 2 g/10 min. In addition to W&C applications the Polymer composition (Pc') can be used in other polymer applications as well.

The preferable properties and embodiments of the Cable, Polymer composition including the independent subgroup Polymer composition (Pc'), the PE copolymer, as well as the preparation processes of these are described below. As evident said preferable properties and embodiments are given in general terms meaning that they can be combined in any combination to further define the preferable embodiments of the invention.

DETAILED DESCRIPTION

The Polymer composition comprises the PE copolymer as defined above. The below description applies naturally both for the Polymer composition of the Cable and for the independent Polymer composition (Pc') which is also the preferred subgroup of the Polymer composition of the Cable. If not specified in the description part, then the measurement methods for the further preferable properties as defined below for the Polymer composition of the Cable are described later below under "Determination methods".

PE Copolymer

The PE copolymer has preferably an Mz/Mw of at least 2.50, preferably of from 2.55 to 15.00, preferably of from 2.60 to 10.00, more preferably of at least 2.65 to 10.00. The high Mz/Mw, which indicates the presence of the very high weight average molecular weight fraction in the PE copolymer, provides a good processability without the need to broaden the Mw/Mn or to introduce long chain branches.

In one preferred embodiment the PE copolymer has an Mz of at least 250 000, preferably of at least 260 000, preferably of from 270 000 to 1000 000, and even as high as from 320 000 to 700 000 may be preferred depending on the embodiment.

The PE copolymer has preferably a shear thinning index $SHI_{2.7/210}$ of at least 7.0, preferably of at least 8.0, preferably of at least 8.5, preferably of from 8.5 to 50, preferably of from 9.0 to 30, more preferably of from 9.5 to 20. The preferable SHI of the PE copolymer indicates good rheological properties which further positively contribute to processability.

MWD (Mn/Mw) of the PE copolymer can be e.g. of from 1.5 to 20, preferably of from 2 to 15, preferably of from 2.5 to 10.0, preferably of from 4.5 to 10.0.

Preferably, the density of the PE copolymer is of less than 940 $kg/m^3$, preferably of less than 935 $kg/m^3$, preferably of less than of 930 $kg/m^3$, preferably of from 905 to 925 $kg/m^3$.

Preferable PE copolymers have an $MFR_2$ of from 0.1 to 10.0 g/10 min, preferably from 0.2 to 5.0 g/10 min, more preferably of from 0.2 to 2.5 g/10 min.

The PE copolymer preferably has a weight average molecular weight (Mw) of from 75000 g/mol to 250000 g/mol, more preferably from 100000 g/mol to 250000 g/mol and even as high as from 120000 g/mol to 220000 g/mol may be preferred, depending on the desired embodiment.

The PE copolymer is preferably a multimodal PE copolymer. The term "multimodal" means herein, unless otherwise stated, multimodality with respect to molecular weight distribution and includes also bimodal polymer. Generally, a polyethylene comprising at least two polyethylene fractions, which have been produced under different polymerization conditions resulting in different (weight average) molecular weights and molecular weight distributions for the fractions, is referred to as "multimodal". The prefix "multi" relates to the number of different polymer fractions present in the polymer. Thus, for example, multimodal polymer includes so called "bimodal" polymer consisting of two fractions.

The form of the molecular weight distribution curve, i.e. the appearance of the graph of the polymer weight fraction as a function of its molecular weight, of a multimodal polymer will show two or more maxima or is typically distinctly broadened in comparison with the curves for the individual fractions. For example, if a polymer is produced in a sequential multistage process, utilizing reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions form typically together a broadened molecular weight distribution curve for the total resulting polymer product.

The preferred multimodal PE copolymer of the present invention comprises a lower weight average molecular weight (LMW) component (A) and a higher weight average molecular weight (HMW) component (B). Said LMW component has a lower molecular weight than the HMW component. The PE copolymer comprises preferably:

(A) from 30 to 70% by weight, based on the combined amount of components (A) and (B), of a low molecular weight (LMW) ethylene polymer selected from ethylene homopolymer and a copolymer of ethylene with one or more alpha-olefin comonomer(s) having from 3 to 20 carbon atoms, and (B) from 30 to 70% by weight, based on the combined amount of components (A) and (B), of a high molecular weight (HMW) copolymer of ethylene with one or more alpha-olefin comonomer(s) having from 3 to 20 carbon atoms.

Said LMW polymer (A) is preferably a copolymer of ethylene with one or more alpha-olefin(s) having from 4 to 10 carbon atoms, preferably with one or more 4 to 8 carbon atoms, and said HMW copolymer of ethylene (B) is a copolymer of ethylene with one or more alpha-olefin(s) having from 4 to 10 carbon atoms, preferably with one or more 4 to 8 carbon atoms.

Comonomer as used herein means monomer units other than ethylene which are copolymerisable with ethylene.

More preferably, said LMW polymer (A) has a weight average molecular weight of from 5000 to 150000 g/mol, preferably 5000 to 130000 g/mol, preferably from 10000 to 100000 g/mol, more preferably from 15000 to 80000 g/mol. Preferably said LMW polymer (A) may have a density of less than 945 g/m³, preferably from 910 to 943 $kg/m^3$.

Said HMW polymer (B) has preferably a weight average molecular weight of from 100000 to 1000000 g/mol, preferably from 130000 to 500000 g/mol, more preferably from 150000 to 500000 g/mol. Said HMW polymer (B) has preferably a melt index $MFR_2$ of from 0.01 to 0.3 g/10 min. Moreover, the HMW polymer (B) has molecular weight distribution having a ratio of the weight average molecular weight to the number average molecular weight preferably of from 2.0 to 5.0, more preferably from 2.0 to 4.5. Furthermore, the HMW polymer (B) preferably has a density of from 880 to 929 $kg/m^3$, more preferably from 880 to 925 $kg/m^3$, and especially preferably from 880 to 922 $kg/m^3$.

In a very preferable embodiment of the invention the PE copolymer has a flexural modulus of less than 750 MPa, preferably less than 500 MPa. In some embodiments wherein high flexibility is desired, then the flexural modulus is less than 450 MPa, preferably of less than 400 MPa, more preferably of less than 330 MPa. In applications wherein high flexibility is desired, then a flexural modulus of even less than 300 MPa, preferably of from 50 to 280 MPa, can be provided by the PE copolymer. In this high flexibility embodiment the PE copolymer is preferably said multimodal PE copolymer, wherein said LMW polymer (A) is a copolymer and has preferably a density of less than 945 g/m³, preferably from 910 to 943 kg/m³. The PE copolymer of this embodiment may thus have a low flexural modulus, which provides a high flexibility, which is a desirable property i.a. in W&C applications.

The term "PE copolymer" as used herein encompasses polymers comprising repeat units deriving from ethylene and at least one other C3-20 alpha olefin monomer. Preferably, PE copolymer may be formed from ethylene together with at least one C4-10 alpha-olefin comonomer, e.g. 1-butene, 1-hexene or 1-octene. Preferably, PE copolymer is a binary copolymer, i.e. the polymer contains ethylene and one comonomer, or a terpolymer, i.e. the polymer contains ethylene and two or three comonomers. Preferably, PE copolymer comprises an ethylene hexene copolymer, ethylene octene copolymer or ethylene butene copolymer. The amount of comonomer present in PE copolymer is at least 0.25 mol-%, preferably at least 0.5 mol-%, such as preferably 0.5 to 10 mol %, e.g. 2 to 5 mol-% relative to ethylene. Alternatively, comonomer contents present in PE copolymer may be 0.5 to 20 wt %, especially 2 to 10 wt % relative to ethylene. In any copolymeric HMW component, preferably at least 0.5 mol-%, e.g. at least 1.0 mol %, such as up to 10 mol-%, of repeat units are derived from said comonomer.

As a subgroup of the PE copolymer suitable for the Cable, the invention further provides independently a Polymer composition (Pc') comprising a copolymer of ethylene which is the PE copolymer as defined above which has a density of less than 945 kg/m³, a Mz/Mw of at least 2.45, is obtainable by polymerising ethylene in the presence of a single site catalyst and an activator for the single site catalyst and, additionally, has an $MFR_2$ of 0.2 to 10 g/10 min. Preferably, in this independent subgroup PE copolymer (Pc'), the PE copolymer has an $MFR_2$ of from 0.2 to 5.0 g/10 min, more preferably of from 0.2 to 2.5 g/10 min, the density of less than 940, preferably less than 935, preferably less than 930, preferably from 905 to 925 kg/m³, Mz/Mw of at least 2.50, preferably of from 2.55 to 15.00, preferably of from 2.60 to 10.00, more preferably of at least 2.65 to 10.00.

More preferably, in this independent Polymer composition (Pc') subgroup, the ethylene copolymer is preferably a multimodal PE copolymer which comprises:
(A) from 30 to 70% by weight, preferably from 40 to 60 wt %, more preferably from 45 to 55 wt %, based on the combined amount of components (A) and (B), of a low molecular weight (LMW) ethylene polymer selected from ethylene homopolymer and a copolymer of ethylene with one or more alpha-olefin comonomer(s) having from 3 to 20 carbon atoms, and
(B) from 30 to 70% by weight, preferably from 40 to 60 wt %, more preferably from 45 to 55 wt %, based on the combined amount of components (A) and (B), of a high molecular weight (HMW) copolymer of ethylene with one or more alpha-olefin comonomer(s) having from 3 to 20 carbon atoms.

In this independent subgroup of the Polymer composition (Pc') the PE copolymer has more preferably at least one, preferably two or more, in any combination, of the following further properties,
(i) The PE copolymer is said multimodal PE copolymer which comprises said LMW polymer (A) which is a copolymer of ethylene with one or more alpha-olefin(s) having from 4 to 10 carbon atoms, preferably with one or more 4 to 8 carbon atoms, and said HMW copolymer (B) which is a copolymer of ethylene with one or more alpha-olefin(s) having from 4 to 10 carbon atoms, preferably with one or more 4 to 8 carbon atoms,
(ii) Mz of at least 250 000, preferably of at least 260 000, preferably of from 270 000 to 1000 000, and even as high as from 320 000 to 700 000 may be preferred depending on the embodiment,
(iii) MWD (Mw/Mn) of 1.5 to 20, preferably of 2 to 16, more preferably of 2.5 to 10, more preferably of from 4.55 to 10,
(iv) $SHI_{2.7/210}$ of at least 7.0, preferably of at least 8.0, preferably of at least 8.5, preferably of from 8.5 to 50, preferably from 9.0 to 30, more preferably from 9.5 to 20,
(v) Flexural modulus of less than 750 MPa, preferably less than 500 MPa, preferably less than 450 MPa, preferably less than 400 MPa, preferably of less than 330 MPa,
(vi) The PE copolymer is said multimodal PE copolymer which comprises said LMW polymer (A) which has a density of less than 945 g/m³, preferably from 910 to 943 kg/m³, or
(vii) The PE copolymer is said multimodal PE copolymer which has a flexural modulus of less than 750 MPa, preferably less than 500 MPa, preferably less than 450 MPa, preferably less than 400 MPa, preferably of less than 330 MPa, and comprises the (LMW) ethylene copolymer (A) which has a density of less than 945 g/m³, preferably from 910 to 943 kg/m³;
preferably the PE copolymer has all, of the above properties (i) to (vii).

It is known that the properties of polymers differ depending on whether the polymer is polymerised by using a Ziegler-Natta catalyst, Cr catalyst or single site catalyst. The invention is thus based on a polymer composition suitable for a cable layer, which polymer has advantageous properties and is produced by a single site catalyst. The PE copolymer of the Polymer composition, including any embodiments and subgroup Polymer composition (Pc'), is thus obtainable by polymerising ethylene in the presence of a single site catalyst and an activator for said catalyst, preferably the PE copolymer is a multimodal ethylene copolymer which comprises a low molecular weight copolymer of ethylene (A) and a high molecular weight copolymer of ethylene (B) and is obtainable by polymerising ethylene in the presence of a single site catalyst and an activator for said catalyst. In case of the preferred multimodal PE copolymer the LMW polymer (A) and the HMW polymer (B) are preferably obtainable by using the same single site catalyst. Naturally the polymerisation of ethylene occurs together with monomer units of one or more comonomer(s).

The expressions "obtainable by" or "produced by" are used herein interchangeably and mean the category "product by process", i.e. that the product has a technical feature which is due to the preparation process.

The PE copolymer may comprise further polymer components, e.g. three components being a trimodal PE copolymer. The amount of such further components is preferably up to 10 wt %, preferably up to 5 wt %, based on the amount of the PE copolymer. Preferably the PE copolymer consists of LMW and HMW polymer components. Optionally multimodal PE copolymer, e.g. the preferable bimodal PE copolymer, may also comprise e.g. up to 5 wt % of a well known polyethylene prepolymer which is obtainable from a prepolymerisation step as well known in the art, e.g. as described in WO9618662. In case of such prepolymer, the prepolymer component is typically comprised in one of LMW and HMW components, or alternatively forms a separate Mw fraction, i.e. further component, of the PE copolymer. and thus contributes to the multimodality, By ethylene homopolymer is meant a polymer which substantially consists of ethylene units. As the process streams may have a small amount of other polymerisable species as impurities the homopolymer may contain a small amount of units other than ethylene. The content of such units should be lower than 0.2% by mole, preferably less than 0.1% by mole.

Polymerisation Process

The PE copolymer may be a unimodal with respect to the MWD. The unimodal PE copolymer can be obtainable by a single stage polymerisation in a single reactor in a well known and documented manner. Preferably the PE copolymer is a multimodal (e.g. bimodal) PE copolymer which can be obtainable by blending mechanically together two or more separate polymer components or, preferably, by in-situ blending in a multistage polymerisation process during the preparation process of the polymer components. Both mechanical and in-situ blending are well known in the field.

The preferred multimodal PE copolymer is typically produced in a multistage polymerisation process in the presence of a single site catalyst.

In the multistage polymerisation process ethylene and alpha-olefins having from 4 to 10 carbon atoms are polymerised in a process comprising at least two polymerisation stages. Each polymerisation stage may be conducted in a separate reactor but they may also be conducted in at least two distinct polymerisation zones in one reactor. Preferably, the multistage polymerisation process is conducted in at least two cascaded polymerisation stages.

Catalyst

The polymerisation is typically conducted in the presence of a single site polymerisation catalyst. Preferably the single site catalyst is a metallocene catalyst. Such catalysts comprise a transition metal compound which typically contains an organic ligand, preferably a cyclopentadienyl, indenyl or fluorenyl ligand. Preferably the catalyst contains two cyclopentadienyl, indenyl or fluorenyl ligands, which may be bridged by a group preferably containing silicon and/or carbon atom(s). Further, the ligands may have substituents, such as alkyl groups, aryl groups, arylalkyl groups, alkylaryl groups, silyl groups, siloxy groups, alkoxy groups and like. Suitable metallocene compounds are known in the art and are disclosed, among others, in WO-A-97/28170, WO-A-98/32776, WO-A-99/61489, WO-A-03/010208, WO-A-03/051934, WO-A-03/051514, WO-A-2004/085499, WO-A-2005/002744, EP-A-1752462 and EP-A-1739103.

Especially, the metallocene compound must be capable of producing polyethylene having sufficiently high molecular weight. Especially it has been found that metallocene compounds having hafnium as the transition metal atom or metallocene compounds comprising an indenyl or tetrahydroindenyl type ligand often have the desired characteristics.

One example of suitable metallocene compounds is the group of metallocene compounds having zirconium, titanium or hafnium as the transition metal and one or more ligands having indenyl structure bearing a siloxy substituent, such as [ethylenebis(3,7-di(tri-isopropylsiloxy)inden-1-yl)]zirconium dichloride (both rac and meso), [ethylenebis(4,7-di(tri-isopropylsiloxy)inden-1-yl)]zirconium dichloride (both rac and meso), [ethylenebis(5-tert-butyldimethylsiloxy)inden-1-yl)]zirconium dichloride (both rac and meso), bis(5-tert-butyldimethylsiloxy)inden-1-yl)zirconium dichloride, [dimethylsilylenenebis(5-tert-butyldimethylsiloxy)inden-1-yl)]zirconium dichloride (both rac and meso), (N-tert-butylamido)(dimethyl)($\eta^5$-inden-4-yloxy)silanetitanium dichloride and [ethylenebis(2-(tert-butydimethylsiloxy)inden-1-yl)]zirconium dichloride (both rac and meso).

Another example is the group of metallocene compounds having hafnium as the transition metal atom and bearing a cyclopentadienyl type ligand, such as bis(n-butylcyclopentadienyl)hafnium dichloride, bis(n-butylcyclopentadienyl)dibenzylhafnium, dimethylsilylenenebis(n-butylcyclopentadienyl)hafnium dichloride (both rac and meso) and bis[1,2,4-tri(ethyl)cyclopentadienyl]hafnium dichloride.

Still another example is the group of metallocene compounds bearing a tetrahydroindenyl ligand such as bis(4,5,6,7-tetrahydroindenyl)zirconium dichloride, bis(4,5,6,7-tetrahydroindenyl)hafnium dichloride, ethylenebis(4,5,6,7-tetrahydroindenyl)zirconium dichloride, dimethylsilylenebis(4,5,6,7-tetrahydroindenyl)zirconium dichloride.

It is evident that the single site catalyst typically also comprises an activator. Generally used activators are alumoxane compounds, such as methylalumoxane (MAO), tetraisobutylalumoxane (TIBAO) or hexaisobutylalumoxane (HIBAO). Also boron activators, such as those disclosed in US-A-2007/049711 may be used. The activators mentioned above may be used alone or they may be combined with, for instance, aluminium alkyls, such as triethylaluminium or tri-isobutylaluminium.

The catalyst is preferably supported. The support may be any particulate support, including inorganic oxide support, such as silica, alumina or titania, or polymeric support, such as polymer comprising styrene or divinylbenzene.

The catalyst may also comprise the metallocene compound on solidified alumoxane or it may be a solid catalyst prepared according to emulsion solidification technology. Such catalysts are disclosed, among others, in EP-A-1539775 or WO-A-03/051934.

Polymerisation

It is evident that the claimed properties as such, i.e. individually, are very well known, but the claimed balance thereof (i.e. combination of the claimed ranges) is novel and surprisingly suitable for W&C applications. The new property balance can be obtained by controlling the process conditions and optionally by choice of catalyst, which can be a conventional catalyst, as well known to a skilled person. E.g. molecular weight distribution (MWD) and molecular weight (Mw, Mn and Mz) can be tailored i.a. by adapting the split and chain length of the HMW component using e.g. hydrogen, as well known in the art.

The PE copolymer, preferably the multimodal PE copolymer may be produced in any suitable polymerisation process known in the art. The polymerisation process is described herein for the multimodal PE copolymer and it is evident that the unimodal PE copolymer can be produced e.g. in any of the below reaction zones and reactors.

Into the polymerisation zone a catalyst, ethylene, optionally an inert diluent, and optionally hydrogen and/or comonomer are introduced. The low molecular weight ethylene polymer component is preferably produced in a first polymerisation zone and the high molecular weight ethylene copolymer component is produced in a second polymerisation zone. The first polymerisation zone and the second polymerization zone may be connected in any order, i.e. the first polymerisation zone may precede the second polymerisation zone, or the second polymerisation zone may precede the first polymerisation zone or, alternatively, polymerisation zones may be connected in parallel. However, it is preferred to operate the polymerisation zones in cascaded mode. The polymerisation zones may operate in slurry, solution, or gas phase conditions or in any combinations thereof. Suitable reactor configurations are disclosed, among others, in WO-A-92/12182, EP-A-369436, EP-A-503791, EP-A-881237 and WO-A-96/18662. Examples of processes where the polymerisation zones are arranged within one reactor system are disclosed in WO-A-99/03902, EP-A-782587 and EP-A-1633466.

It is often preferred to remove the reactants of the preceding polymerisation stage from the polymer before introducing it into the subsequent polymerisation stage. This is preferably done when transferring the polymer from one polymerisation stage to another. Suitable methods are disclosed, among others, in EP-A-1415999 and WO-A-00/26258.

The polymerisation in the polymerisation zone may be conducted in slurry. The catalyst can be fed e.g. in a conventional manner to the reactor. Then the polymer particles formed in the polymerisation, together with the catalyst fragmented and dispersed within the particles, are suspended in the fluid hydrocarbon. The slurry is agitated to enable the transfer of reactants from the fluid into the particles.

The polymerisation usually takes place in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons. An especially preferred diluent is propane, possibly containing minor amount of methane, ethane and/or butane.

The ethylene content in the fluid phase of the slurry may be from 2 to about 50% by mole, preferably from about 3 to about 20% by mole and in particular from about 5 to about 15%) by mole. The benefit of having a high ethylene concentration is that the productivity of the catalyst is increased but the drawback is that more ethylene then needs to be recycled than if the concentration was lower.

The temperature in the slurry polymerisation is typically from 50 to 115° C., preferably from 60 to 110° C. and in particular from 70 to 105° C. The pressure is from 1 to 150 bar, preferably from 10 to 100 bar.

The slurry polymerisation may be conducted in any known reactor used for slurry polymerisation. Such reactors include a continuous stirred tank reactor and a loop reactor. It is especially preferred to conduct the polymerisation in a loop reactor. In such reactors the slurry is circulated with a high velocity along a closed pipe by using a circulation pump. Loop reactors are generally known in the art and examples are given, for instance, in U.S. Pat. No. 4,582,816, U.S. Pat. No. 3,405,109, U.S. Pat. No. 3,324,093, EP-A-479186 and U.S. Pat. No. 5,391,654.

It is sometimes advantageous to conduct the slurry polymerisation above the critical temperature and pressure of the fluid mixture. Such operation is described in U.S. Pat. No. 5,391,654. In such operation the temperature is typically from 85 to 110° C., preferably from 90 to 105° C. and the pressure is from 40 to 150 bar, preferably from 50 to 100 bar.

The slurry may be withdrawn from the reactor either continuously or intermittently. A preferred way of intermittent withdrawal is the use of settling legs where slurry is allowed to concentrate before withdrawing a batch of the concentrated slurry from the reactor. The use of settling legs is disclosed, among others, in U.S. Pat. No. 3,374,211, U.S. Pat. No. 3,242,150 and EP-A-1310295. Continuous withdrawal is disclosed, among others, in EP-A-891990, EP-A-1415999, EP-A-1591459, EP-A-1591460 and WO-A-2007/025640. The continuous withdrawal is advantageously combined with a suitable concentration method, as disclosed in EP-A-1310295 and EP-A-1591460.

If the low molecular weight ethylene polymer is produced in slurry polymerisation stage then hydrogen is added to the slurry reactor so that the molar ratio of hydrogen to ethylene in the reaction phase is from 0.1 to 1.0 mol/kmol, and preferably from 0.2 to 0.7 mol/kmol. Comonomer may then also be introduced into the slurry polymerisation stage so that the molar ratio of comonomer to ethylene in the reaction phase does not exceed 150 mol/kmol.

If the high molecular weight ethylene polymer is produced in slurry polymerisation stage then hydrogen is added to the slurry reactor so that the molar ratio of hydrogen to ethylene in the reaction phase is at most 0.1 mol/kmol, preferably from 0.01 to 0.07 mol/kmol. Comonomer is introduced into the slurry polymerisation stage so that the molar ratio of comonomer to ethylene is from 30 to 120 mol/kmol.

The polymerisation may also be conducted in gas phase. In a fluidised bed gas phase reactor an olefin is polymerised in the presence of a polymerisation catalyst in an upwards moving gas stream. The reactor typically contains a fluidised bed comprising the growing polymer particles containing the active catalyst located above a fluidisation grid.

The polymer bed is fluidised with the help of the fluidisation gas comprising the olefin monomer, eventual comonomer(s), eventual chain growth controllers or chain transfer agents, such as hydrogen, and eventual an inert gas. The fluidisation gas is introduced into an inlet chamber at the bottom of the reactor. To make sure that the gas flow is uniformly distributed over the cross-sectional surface area of the inlet chamber the inlet pipe may be equipped with a flow dividing element as known in the art, e.g. U.S. Pat. No. 4,933,149 and EP-A-684871.

From the inlet chamber the gas flow is passed upwards through a fluidisation grid into the fluidised bed. The purpose of the fluidisation grid is to divide the gas flow evenly through the cross-sectional area of the bed. Sometimes the fluidisation grid may be arranged to establish a gas stream to sweep along the reactor walls, as disclosed in WO-A-2005/087361. Other types of fluidisation grids are disclosed, among others, in U.S. Pat. No. 4,578,879, EP-A-600414 and EP-A-721798. An overview is given in Geldart and Bayens: The Design of Distributors for Gas-fluidized Beds, Powder Technology, Vol. 42, 1985.

The fluidisation gas passes through the fluidised bed. The superficial velocity of the fluidisation gas must be higher that minimum fluidisation velocity of the particles contained in the fluidised bed, as otherwise no fluidisation would occur. On the other hand, the velocity of the gas should be lower than the onset velocity of pneumatic transport, as otherwise the whole bed would be entrained with the fluidisation gas. The minimum fluidisation velocity and the onset velocity of pneumatic transport can be calculated when the particle characteristics are know by using common engineering practise. An overview is given, among others in Geldart: Gas Fluidization Technology, J. Wiley & Sons, 1986.

When the fluidisation gas is contacted with the bed containing the active catalyst the reactive components of the gas, such as monomers and chain transfer agents, react in the presence of the catalyst to produce the polymer product. At the same time the fluidisation gas removes the reaction heat from the polymerising particles in the fluidised bed.

The unreacted fluidisation gas is removed from the top of the reactor and cooled in a heat exchanger to remove the heat of reaction. The gas is cooled to a temperature which is lower than that of the bed to prevent the bed from heating because of the reaction. It is possible to cool the gas to a temperature where a part of it condenses. When the liquid droplets enter the reaction zone they are vaporised. The vaporisation heat then contributes to the removal of the reaction heat. This kind of operation is called condensed mode and variations of it are disclosed, among others, in WO-A-2007/025640, U.S. Pat. No. 4,543,399, EP-A-699213 and WO-A-94/25495. It is also possible to add condensing agents into the recycle gas stream, as disclosed in EP-A-696293. The condensing agents are non-polymerisable components, such as n-pentane, isopentane, n-butane or isobutene, which are at least partially condensed in the cooler.

The gas is then compressed, cooled and recycled into the inlet chamber of the reactor. Prior to the entry into the reactor fresh reactants are introduced into the fluidisation gas stream to compensate for the losses caused by the reaction and product withdrawal. It is generally known to analyse the composition of the fluidisation gas and introduce the gas components to keep the composition constant. The actual composition is determined by the desired properties of the product and the catalyst used in the polymerisation.

The catalyst may be introduced into the reactor in various ways, either continuously or intermittently. Among others, WO-A-01/05845 and EP-A-499759 disclose such methods. Where the gas phase reactor is a part of a reactor cascade the catalyst is usually dispersed within the polymer particles from the preceding polymerisation stage. The polymer particles may be introduced into the gas phase reactor as disclosed in EP-A-1415999 and WO-A-00/26258.

The polymeric product may be withdrawn from the gas phase reactor either continuously or intermittently. Combinations of these methods may also be used. Continuous withdrawal is disclosed, among others, in WO-A-00/29452. Intermittent withdrawal is disclosed, among others, in U.S. Pat. No. 4,621,952, EP-A-188125, EP-A-250169 and EP-A-579426.

The top part of the gas phase reactor may include a so called disengagement zone. In such a zone the diameter of the reactor is increased to reduce the gas velocity and allow the particles that are carried from the bed with the fluidisation gas to settle back to the bed.

The bed level may be observed by different techniques known in the art. For instance, the pressure difference between the bottom of the reactor and a specific height of the bed may be recorded over the whole length of the reactor and the bed level may be calculated based on the pressure difference values. Such a calculation yields a time-averaged level. It is also possible to use ultrasonic sensors or radioactive sensors. With these methods instantaneous levels may be obtained, which of course may then be averaged over time to obtain time-averaged bed level.

Also antistatic agent(s) may be introduced into the gas phase reactor if needed. Suitable antistatic agents and methods to use them are disclosed, among others, in U.S. Pat. No. 5,026,795, U.S. Pat. No. 4,803,251, U.S. Pat. No. 4,532,311, U.S. Pat. No. 4,855,370 and EP-A-560035. They are usually polar compounds and include, among others, water, ketones, aldehydes and alcohols.

The reactor may also include a mechanical agitator to further facilitate mixing within the fluidised bed. An example of suitable agitator design is given in EP-A-707513.

If the low molecular weight ethylene polymer is produced in gas phase polymerisation stage then hydrogen is added to the gas phase reactor so that the molar ratio of hydrogen to ethylene is from 0.1 to 1.0 mol/kmol, and preferably from 0.2 to 0.7 mol/kmol. Comonomer may then also be introduced into the gas phase polymerisation stage so that the molar ratio of comonomer to ethylene does not exceed 150 mol/kmol.

If the high molecular weight ethylene polymer is produced in gas phase polymerisation stage then hydrogen is added to the gas phase reactor so that the molar ratio of hydrogen to ethylene is at most 0.6 mol/kmol, preferably at most 0.5 mol/kmol. Comonomer is introduced into the gas phase polymerisation stage so that the molar ratio of comonomer to ethylene is typically from 30 to 120 mol/kmol.

Where the other of the component(s), e.g. the higher molecular weight component, is made as a second step in a multistage polymerisation it is not possible to measure its properties directly. However, e.g. the density, $MFR_2$ etc of the component, e.g. HMW component, made in the subsequent step can be calculated using Kim McAuley's equations. Thus, both density and $MFR_2$ can be found using K. K. McAuley and J. F. McGregor: On-line Inference of Polymer Properties in an Industrial Polyethylene Reactor, AIChE Journal, June 1991, Vol. 37, No, 6, pages 825-835. The density is calculated from McAuley's equation 37, where final density and density after the first reactor is known. $MFR_2$ is calculated from McAuley's equation 25, where final $MFR_2$ and $MFR_2$ after the first reactor is calculated.

Prepolymerisation may precede the actual polymerisation step(s), as well known in the field. Then the single site catalyst is fed to the prepolymerisation step and after said step the obtained reaction mixture together with the catalyst is then fed to the actual polymerisation step(s). In case of a multistage polymerisation, the reaction mixture together with the catalyst which is obtained from the previous polymerisation zone, e.g. a reactor, is then fed to the subsequent polymerisation step to a subsequent reaction zone, e.g. a reactor.

The preferred polymerisation is the multistage polymerisation, wherein the LMW polymer (A) is preferably polymerised in a slurry, such as loop, reactor and the obtained reaction product together with the single site catalyst is then preferably transferred to a gas phase reactor for polymerising the HMW polymer (B) in the presence of said LMW polymer (A). The polymerisation of each stage is preferably carried out as described above. The prepolymerisation may precede the actual polymerisation steps.

Homogenisation and Pelletisation

The Polymer composition comprising the multimodal PE copolymer is homogenised and pelletised using a method known in the art. Preferably, a twin screw extruder is used. Such extruders are known in the art and they can be divided in co-rotating twin screw extruders, as disclosed in WO-A-98/15591, and counter-rotating twin screw extruders, as disclosed in EP-A-1600276 In the co-rotating twin screw extruder the screws rotate in the same direction whereas in the counter-rotating extruder they rotate in opposite directions. An overview is given, for example, in Rauwendaal: Polymer Extrusion (Hanser, 1986), chapters 10.3 to 10.5, pages 460 to 489. Especially preferably a counter-rotating twin screw extruder is used.

To ensure sufficient homogenisation of the Polymer composition during the extrusion the specific energy input must be on a sufficiently high level, but not excessive, as otherwise degradation of polymer and/or additives would occur. The required SEI level depends somewhat on the screw configuration and design and are within the skills of the skilled person. Suitable levels of specific energy input (SEI) are from 200 to 300 kWh/ton, preferably from 210 to 290 kWh/ton.

Polymer Composition

Typically the polymer composition comprises at least 50% by weight of the multimodal PE copolymer, preferably from 80 to 100% by weight and more preferably from 85 to 100% by weight, based on the total weight of the composition. The preferred Polymer composition consists of PE copolymer. The expression means that the Polymer composition does not contain further polymer components, but the multimodal PE copolymer as the sole polymer component. However, it is to be understood herein that the Polymer Composition may comprise further components such as additives which may optionally be added in a mixture with a carrier polymer, i.e. in so called master batch.

The polymer composition may thus contain further additives such as additives conventionally used in W&C applications. Part or all of the optional additives can be added e.g. to the PE copolymer before the above described homogenisation and pelletisation step to obtain the Polymer composition. As an equal alternative, part or all of the optional additives can be added to the Polymer composition after the pelletisation step before or during the preparation process of an article, preferably a Cable, thereof. The additives may be used in conventional amounts.

For instance, Polymer composition may be crosslikable and contains a crosslinking additive, such as a free radical generating agent for crosslinking via radical reaction, or e.g. a silanol condensation catalyst for crosslinking via hydrolysable silane groups. Preferably, the crosslinking agent contains —O—O— bond or —N=N-bond, more preferably is a peroxide, preferably organic peroxide, such as 2,5-di(tert-butylperoxy)-2,5-dimethylhexane, di(tert-butylperoxy-isopropyl)benzene, dicumylperoxide, tert-butylcumylperoxide, di(tert-butyl)peroxide, or mixtures thereof, however without limiting thereto.

Further non-limiting examples of additive(s) for W&C applications include antioxidant(s), stabiliser(s), scorch retardant agent(s), processing aid(s), flame retardant additive(s), water tree retardant additive(s), acid scavenger(s), crosslinking booster(s), inorganic filler(s), such as carbon black, and voltage stabilizer(s).

Cable and Cable Manufacture

The at least one layer of the Cable comprises at least the Polymer Composition as defined above or below. The Cable layer(s) may also comprise a blend of the Polymer composition together with one or more different Polymer composition(s) and/or with further polymer components.

The Cable is preferably selected from
a communication cable for communication applications comprising one or more wires surrounded by at least one layer, which is preferably an insulation layer, and the one wire or a bundle of the two or more wires is then surrounded by at least a sheath layer, which is also called as a jacketing layer and which forms the outermost polymeric layer for protecting the one or more wires, or from
a power cable, which comprises a conductor surrounded by at least one layer, preferably at least an insulation layer and a jacketing layer, in that order,
wherein at least one layer comprises the Polymer composition as defined above or in claims below. The communication and power cable have a well known meaning in the W&C field.

A communication cable is a cable for transferring information signals like telecommunication cables or coaxial cables. A telecommunication cable comprises a plurality of telesingle wires each surrounded by an insulation composition, typically an insulation layer. The number of telesingle wires may vary from a few in a data transmission cable to up to several thousands in telephone cables. All these wires are then surrounded by a common protective sheath layer, also called as jacketing layer, which surrounds and protects the wire bundle. Preferably the sheath layer comprises, preferably consists of the polymer composition of the invention.

A coaxial cable has typically one centre conductor and at least one outer concentric conductor. If more than one outer conductor is used, e.g. triaxial cables, they are separated by an electrically isolating layer. Also the coaxial cables are surrounded by at least a sheath, also called jacketing, layer. The sheath layer preferably comprises, more preferably consists of, the polymer composition of the invention.

A power cable is a cable transferring energy operating at any voltage, typically operating at voltages higher than 220 V. The voltage applied to the power cable can be alternating (AC), direct (DC), or transient (impulse). The Polymer composition is also very suitable for layers of power cables such as low voltage (LV) (e.g. 1 kV cables), medium voltage (MV), high voltage (HV) and extra high voltage (EHV) power cables, which terms have well known meaning and indicate the operating level of such cable.

The preferable MV, HV and EHV Cable embodiment of the invention comprises at least an inner semiconductive layer, insulation layer, an outer semiconductive layer and optionally, and preferably, a jacketing layer, in that order, wherein at least one of said layers, preferably at least the jacketing layer, comprises, preferably consists of, said Polymer composition of the invention.

The preferable 1 kV cable embodiment of the invention compromises at least an insulation layer and optionally a bedding layer and optionally and preferably, a jacketing layer, in that order, wherein at least one of said layers, preferably at least the jacketing layer, comprises, preferably consist of, said Polymer composition of the invention.

The said at least one layer of the Cable comprising the Polymer composition as defined above or in claims below is very preferable a jacketing layer.

Cables according to the present invention can be produced according to the methods known in the art using the polymer composition as described above.

Accordingly, the invention also provides a process for producing a Cable, which process comprises steps of a) applying on a conductor one or more layers by using the Polymer composition as defined above and below.

The process for producing a Cable, such as a communication or power cable, as defined above and below, comprises melt mixing, i.e. blending the Polymer composition as defined above, including the subgroups and embodiments thereof, optionally with other polymer components and optionally with additives, above the melting point of at least the major polymer component(s) of the obtained mixture, and (co)extruding the obtained melt mixture on a conductor for forming one or more polymer layer(s), wherein at least one contains the Polymer composition. Melt mixing is preferably carried out in a temperature of 20-25° C. above the melting or softening point of polymer component(s). Preferably, said Polymer composition is used in form of pellets which are added to the mixing step and melt mixed. The additives may be added before or during the Cable manufacturing process. The processing temperatures and devices are well known in the art, e.g. conventional mixers and extruders, such as single or twins screw extruders, are suitable for the process of the invention.

The Cable can be crosslinkable, wherein at least one of the layers can be crosslinked to provide a crosslinked Cable. Invention provides also a Cable which is crosslinkable and a crosslinked Cable.

Accordingly, the Cable manufacture process comprises optionally a further subsequent step of b) crosslinking a crosslinkable polymer, e.g. a crosslinkable Polymer composition, in at least one cable layer of the obtained Cable, wherein the crosslinking is effected in the presence of a crosslinking agent, which is preferably a peroxide. Typically the crosslinking temperature is at least 20° C. higher than the temperature used in meltmixing step and can be estimated by a skilled person.

Usable manufacturing and crosslinking processes and devices are known and well documented in the literature.

Determination Methods

Unless otherwise stated the following methods were used for determining the properties of the PE copolymer as given in the description or in the experimental part and claims below.

Melt Index

The melt flow rate (MFR) is determined according to ISO 1133 and is indicated in g/10 min. The MFR is an indication of the melt viscosity of the polymer. The MFR is determined at 190° C. for PE. The load under which the melt flow rate is determined is usually indicated as a subscript, for instance $MFR_2$ is measured under 2.16 kg load (condition D), $MFR_5$ is measured under 5 kg load (condition T) or $MFR_{21}$ is measured under 21.6 kg load (condition G).

The quantity FRR (flow rate ratio) is a measure of the shear thinning and denotes the ratio of flow rates at different loads. Thus, $FRR_{21/2}$ denotes the value of $MFR_{21}/MFR_2$. FRR is influenced by the molecular weight distribution and the branching structure of the polymer.

Comonomer Content (NMR)

The comonomer content was determined by quantitative nuclear magnetic resonance (NMR) spectroscopy, 13C-NMR, after basic assignment (e.g. "NMR Spectra of Polymers and Polymer Additives", A. J. Brandolini and D. D. Hills, 2000, Marcel Dekker, Inc. New York). Experimental parameters were adjusted to ensure measurement of quantitative spectra for this specific task (e.g "200 and More NMR Experiments: A Practical Course", S. Berger and S. Braun, 2004, Wiley-VCH, Weinheim). The 13C-NMR spectra were recorded on Bruker 400 MHz spectrometer at 130° C. from samples dissolved in 1,2,4-trichlorobenzene/benzene-d6 (90/10 w/w). Quantities were calculated using simple corrected ratios of the signal integrals of representative sites in a manner known in the art.

Density

Density of the polymer was measured according to ISO 1183/1872-2B.

For the purpose of this invention the density of the blend can be calculated from the densities of the components according to:

$$\rho_b = \Sigma w_i \cdot \rho_i$$

where
$\rho_b$ is the density of the blend,
$w_i$ is the weight fraction of component "i" in the blend and
$\rho_i$ is the density of the component "i".

Molecular Weight

Mz, Mw, Mn, and MWD are measured by Gel Permeation Chromatography (GPC) according to the following method:

The weight average molecular weight Mw and the molecular weight distribution (MWD=Mw/Mn wherein Mn is the number average molecular weight and Mw is the weight average molecular weight; Mz is the z-average molecular weight) is measured according to ISO 16014-4: 2003 and ASTM D 6474-99. A Waters GPCV2000 instrument, equipped with refractive index detector and online viscosimeter was used with 2×GMHXL-HT and 1×G7000HXL-HT TSK-gel columns from Tosoh Bioscience and 1,2,4-trichlorobenzene (TCB, stabilized with 250 mg/L 2,6-Di tert-butyl-4-methyl-phenol) as solvent at 140° C. and at a constant flow rate of 1 mL/min. 209.5 μL of sample solution were injected per analysis. The column set was calibrated using universal calibration (according to ISO 16014-2:2003) with at least 15 narrow MWD polystyrene (PS) standards in the range of 1 kg/mol to 12 000 kg/mol. Mark Houwink constants were used as given in ASTM D 6474-99. All samples were prepared by dissolving 0.5-4.0 mg of polymer in 4 mL (at 140° C.) of stabilized TCB (same as mobile phase) and keeping for max. 3 hours at a maximum temperature of 160° C. with continuous gentle shaking prior sampling in into the GPC instrument.

Rheology

Rheological parameters such as Shear Thinning Index SHI and Viscosity are determined by using a rheometer, preferably a Anton Paar Physica MCR 300 Rheometer on compression moulded samples under nitrogen atmosphere at 190° C. using 25 mm diameter plates and plate and plate geometry with a 1.8 mm gap according to ASTM 1440-95. The oscillatory shear experiments were done within the linear viscosity range of strain at frequencies from 0.05 to 300 rad/s (ISO 6721-1). Five measurement points per decade were made. The method is described in detail in WO 00/22040.

The values of storage modulus (G'), loss modulus (G") complex modulus (G*) and complex viscosity (η*) were obtained as a function of frequency (ω). $\eta_{100}$ is used as abbreviation for the complex viscosity at the frequency of 100 rad/s.

Shear thinning index (SHI), which correlates with MWD and is independent of Mw, was calculated according to Heino ("Rheological characterization of polyethylene fractions" Heino, E. L., Lehtinen, A., Tanner J., Seppälä, J., Neste Oy, Porvoo, Finland, Theor. Appl. Rheol., Proc. Int. Congr. Rheol., 11th (1992), 1, 360-362, and "The influence of molecular structure on some rheological properties of polyethylene", Heino, E. L., Borealis Polymers Oy, Porvoo, Finland, Annual Transactions of the Nordic Rheology Society, 1995.).

SHI value is obtained by calculating the complex viscosities at given values of complex modulus and calculating the ratio of the two viscosities. For example, using the values of complex modulus of 2.7 kPa and 210 kPa, then η*(2.7 kPa) and η*(210 kPa) are obtained at a constant value of complex modulus of 2.7 kPa and 210 kPa, respectively. The shear thinning index $SHI_{2.7/210}$ is then defined as the ratio of the two viscosities η*(2.7 kPa) and η*(210 kPa), i.e. η(2.7)/η(210).

It is not always practical to measure the complex viscosity at a low value of the frequency directly. The value can be extrapolated by conducting the measurements down to the frequency of 0.126 rad/s, drawing the plot of complex viscosity vs. frequency in a logarithmic scale, drawing a best-fitting line through the five points corresponding to the lowest values of frequency and reading the viscosity value from this line.

Flexural Modulus

Flexural modulus was determined according to ISO 178. The test specimens were 80×10×4.0 mm (length×width×thickness). The length of the span between the supports was 64 mm, the test speed was 2 mm/min and the load cell was 100 N. The equipment used was an Alwetron TCT 25.

EXPERIMENTAL PART

Examples 1-3 were prepared as described below and they represented the multimodal SS PE polymer and Polymer composition of the invention. Comparative examples 1 and 2 were also prepared as reference SS PE copolymers having lower Mz/Mw values.

Example 1

Catalyst 1
Preparation of the Catalyst

The catalyst complex used in the polymerisation examples was bis(n-butylcyclopentadienyl) hafnium dibenzyl, ((n-BuCp)$_2$Hf(CH$_2$Ph)$_2$), and it was prepared according to "Catalyst Preparation Example 2" of WO2005/002744, starting from bis(n-butylcyclopentadienyl) hafnium dichloride (supplied by Witco).

The catalyst preparation was made in a 160 L batch reactor into which a metallocene complex solution was added. Mixing speed was 40 rpm during reaction and 20 rpm during drying. Reactor was carefully flushed with toluene prior to reaction and purged with nitrogen after silica addition Activated Catalyst System 10.0 kg activated silica (commercial silica carrier, XPO2485A, having an average particle size 20 μm, supplier: Grace) was slurried into 21.7 kg dry toluene at room temperature. Then the silica slurry was added to 14.8 kg of 30 wt % methylalumoxane in toluene (MAO, supplied by Albemarle) over 3 hours. Afterwards the MAO/silica mixture was heated to 79° C. for 6 hours and then cooled down to room temperature again.

The resulting solution was reacted with 0.33 kg of (n-BuCp)$_2$Hf(CH$_2$Ph)$_2$ in toluene (67.9 wt %) for 8 hours at room temperature.

The catalyst was dried under nitrogen purge for 5.5 hours at 50° C.

The obtained catalyst had an Al/Hf mol-ratio of 200, an Hf-concentration of 0.44 wt % and an Al-concentration of 13.2 wt %.

Catalyst 2

The catalyst complex used in the polymerisation examples was bis(n-butylcyclopentadienyl) hafnium dibenzyl, ((n-BuCp)$_2$Hf(CH$_2$Ph)$_2$), and it was prepared according to "Catalyst Preparation Example 2" of WO2005/002744, starting from bis(n-butylcyclopentadienyl) hafnium dichloride (supplied by Witco).

12.4 kg of 30 wt % methylalumoxane in toluene (MAO, supplied by Albemarle), 281 gr of (n-BuCp)$_2$Hf(CH$_2$Ph)$_2$ in toluene (67.9 wt %, supplied by Degussa) and 3.6 kg of toluene were mixed for 2 hours at 40 rpm at room temperature. Reactor was carefully flushed with toluene prior to reaction.

The resulting solution was then transferred to a 160 L reactor onto 10.0 kg activated silica (commercial silica carrier, XPO2485A, having an average particle size 20 μm, supplier: Grace, calcined at 600° C. for 4 hours) and mixed at 40 rpm for 2 hours at 20° C.

The catalyst was dried with 15 rpm mixing under nitrogen purge at 60° C. for 2 hours, and thereafter dried with vacuum at 65° C. for 4 hours.

The obtained catalyst had an Al/Hf mol-ratio of 200, an Hf-concentration of 0.33 wt % and an Al-concentration of 11.2 wt %.

Two-Stage Polymerisation

A loop reactor having a volume of 500 dm$^3$ was operated at 85° C. and 57 bar pressure. Into the reactor were introduced 148 kg/h of propane diluent, 36 kg/h ethylene and 2.2 kg/h of 1-butene. In addition, polymerisation catalyst prepared according to the description above was introduced into the reactor so that the polymerisation rate was 31 kg/h and the conditions in the reactor as shown in Table 1.

The polymer slurry was withdrawn from the loop reactor and transferred into a flash vessel operated at 3 bar pressure and 70° C. temperature where the hydrocarbons were substantially removed from the polymer. The polymer was then introduced into a gas phase reactor operated at a temperature of 80° C. and a pressure of 20 bar. In addition 108 kg/h ethylene, 14 kg/h 1-butene and 1.7 g/h hydrogen was introduced into the reactor. The conditions are shown in Table 1.

The multimodal PE copolymers of example 2, example 3 and comparative examples (C.E.) 1 and 2 were prepared analogously to example 1, but using the catalyst, comonomer(s), amounts and conditions in the reactors as given in Table 1.

The resulting inventive and comparative copolymers each were stabilised with 1500 ppm of Irganox 1010, 500 ppm of Irgafos 168 and 540 ppm Ca-stearate and then the obtained polymer compositions were extruded to pellets in a counter-rotating twin screw extruder CIM90P (manufactured by Japan Steel Works) at conditions given in Table 1.

TABLE 1

Experimental conditions and data

| Examples | | Ex. 1 | Ex. 2 | Ex. 3 | C.E. 1 | C.E. 2 |
|---|---|---|---|---|---|---|
| catalyst type | type | Cat 1 | Cat 1 | Cat 2 | Cat 1 | Cat 1 |
| Prepolymerisation reactor | | Not in use | Not in use | In use see (a) | Not in use | Not in use |
| Loop reactor | | | | | | |
| Temperature | ° C. | 85 | 85 | 85 | 85 | 85 |
| Pressure | bar | 57 | 57 | 60 | 57 | 57 |
| C3 feed | kg/h | 148 | 149 | 134 | 122 | 121 |
| C2 feed | kg/h | 36 | 36 | 32 | 35 | 34 |
| C4 feed | kg/h | 2.2 | 1.9 | 2.7 | 1.8 | 1.7 |
| Ethylene concentration | mol-% | 4.9 | 4.3 | 6.3 | 4.3 | 3.6 |
| H2/C2 ratio | mol/kmol | 0.46 | 0.45 | 0.56 | 0.52 | 0.56 |
| C4/C2 ratio | mol/kmol | 141 | 138 | 111 | 121 | 129 |
| Production rate | kg/h | 31 | 33 | 27 | 32 | 31 |
| Split | wt-% | 53 | 52 | 50 | 53 | 49 |
| Loop polymer, MFR2 | g/10 min | 186 | 180 | 120 | 150 | 320 |
| Loop polymer, density | kg/m3 | 940 | 941 | 936 | 940 | 941 |
| Gas phase reactor | | | | | | |
| Temperature | ° C. | 80 | 80 | 80 | 80 | 80 |
| Pressure | bar | 20 | 20 | 20 | 22 | 22 |
| C2 feed | kg/h | 108 | 102 | 65 | 63 | 71 |
| C4 feed | kg/h | 14 | 15 | 2.4 | 5 | 6 |
| C6 feed | kg/h | | | 7.2 | | |
| H2 feed | kg/h | 1.7 | 1.8 | 2.0 | 2.7 | 1.7 |

TABLE 1-continued

Experimental conditions and data

| Examples | | Ex. 1 | Ex. 2 | Ex. 3 | C.E. 1 | C.E. 2 |
|---|---|---|---|---|---|---|
| Ethylene concentration | mol-% | 56 | 55 | 49 | 41 | 33 |
| H2/C2 ratio | mol/kmol | 0.27 | 0.28 | 0.44 | 0.49 | 0.43 |
| C4/C2 ratio | mol/kmol | 57 | 72 | 17 | 36 | 38 |
| C6/C2 ratio | mol/kmol | | | 21 | | |
| Production rate | kg/h | 28 | 32 | 28 | 32 | 36 |
| Split | wt-% | 47 | 48 | 50 | 47 | 51 |
| Final polymer powder density after GPR | kg/m3 | 922 | 916 | 913 | 927 | 923 |
| Calculated density of GPR component | kg/m3 | 900 | 893 | 890 | 912 | 908 |
| Extruder (JSW CIM90P) | | | | | | |
| Throughput | kg/h | 222 | 225 | 221 | 221 | 218 |
| Screw speed | rpm | 352 | 271 | 339 | 352 | 352 |
| SEI | kWh/kg | 194 | 173 | 284 | 163 | 163 |
| Melt temperature | ° C. | 232 | 222 | 219 | 213 | 215 |
| Polymer composition (pellet) | Pellet | | | | | |
| Final MFR2 | g/10 min | 0.8 | 0.3 | 1.4 | 2.0 | 1.8 |
| Density | kg/m3 | 922 | 918 | 915 | 927 | 923 |

Prepolymmerisation Step for Example 3:

(a) A prepolymerisation step preceded the actual polymerisation step. The prepolymerisation stage was carried out in slurry in a 50 dm³ loop reactor at about 80° C. in a pressure of about 65 bar using the polymerisation catalyst 2. Ethylene butene comonomer was fed in a ratio to provide a Prepolymerisation polymer with density of 945 kg/m³. Propane was used as the diluent and hydrogen was fed in amount to adjust the MFR2 of the prepolymer to about 10 g/10 min. The obtained slurry together with prepolymerised catalyst 2 were introduced into a 500 dm³ loop reactor to carry out the actual polymerisation.

The properties of polymers of the invention of Ex. 1, Ex. 2 and Ex. 3 and comparative polymers C.E. 1 and 2 are given in the table 2.

TABLE 2

GPC/Rheology analysis of the polymer compositions

| | Ex.1 | Ex.2 | Ex.3 | C.E.1 | C.E.2 |
|---|---|---|---|---|---|
| GPC-det. | | | | | |
| Mn | 22200 | 27700 | 21400 | 22700 | 14900 |
| Mw | 125000 | 169000 | 106000 | 95600 | 101000 |
| Mz | 333000 | 460000 | 279000 | 233000 | 245000 |
| Mw/Mn | 5.6 | 6.1 | 4.9 | 4.2 | 6.8 |
| Mz/Mw | 2.7 | 2.7 | 2.6 | 2.4 | 2.4 |
| Dynamic Rheology | | | | | |
| SHI(2.7/210) | 10.7 | 13.9 | 10.5 | 6.1 | 5.5 |

The results in table 2 show that Ex. 1 and Ex. 2 have higher Mz/Mw, indicating a broader molecular weight distribution due to presence of the very high Mw fraction. This cannot be seen Mw/Mn values, which are in similar levels for examples 1 and 2 and comparative examples.

The shear thinning index SHI(2,7/210) supports the better processability (i.e. surface of cables). The processability of Ex. 1, Ex. 2 and Ex. 3 is increased remarkably without changing the Mw/Mn or introducing long chain branches. Table 3 shows the excellent flexibility of the Polymer compositions of Ex. 1, Ex. 2 and Ex. 3 of the invention.

TABLE 3

Mechanical properties of the polymer compositions

| | | Ex. 1 | Ex. 2 | Ex. 3 | C.E. 1 | C.E. 2 |
|---|---|---|---|---|---|---|
| Flexural modulus | MPa | 400 | 320 | 230 | 480 | 410 |

Processability: Surface Smoothness Test:

Jacketing layers were formed from the polymer compositions of Ex. 1, Ex. 2, C.E. 1 and C.E. 2 as follows:

TABLE 4

Extrusion conditions: Conductor: Al; Diameter: 3 mm: no preheating. Screw design extruder (so called semi-pressure tooling): mantling, Die: 5.9 mm, wire guide 3.65 mm, line speed 75 m/min, length of samples 20 m. Temperature of the cooling bath: 23° C.

| | | Extr. temperature° C. in different zones | | | | | | | |
|---|---|---|---|---|---|---|---|---|---|
| Screw | | Zon 1 | Zon 2 | Zon 3 | Zon 4 | Zon 5 | Neck | Head | Die |
| ° C. | | 202 | 205 | 210 | 220 | 220 | 240 | 240 | 240 |

| | | Examples | | | |
|---|---|---|---|---|---|
| | | Ex.1 | Ex. 2 | C.E. 1 | C.E. 2 |
| Line speed | m/min | 75 | 75 | 75 | 75 |
| Air gap | cm | 100 | 100 | 100 | 100 |

Figure 1:
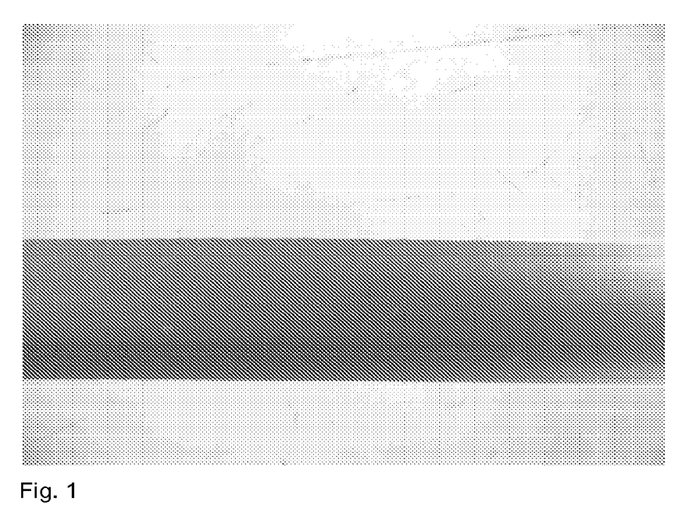
FIG. 1 shows very smooth surface of jacketing layer of a cable which was formed using the Polymer composition of Example 2 of the invention (viewed under light microscope).
Figure 2:
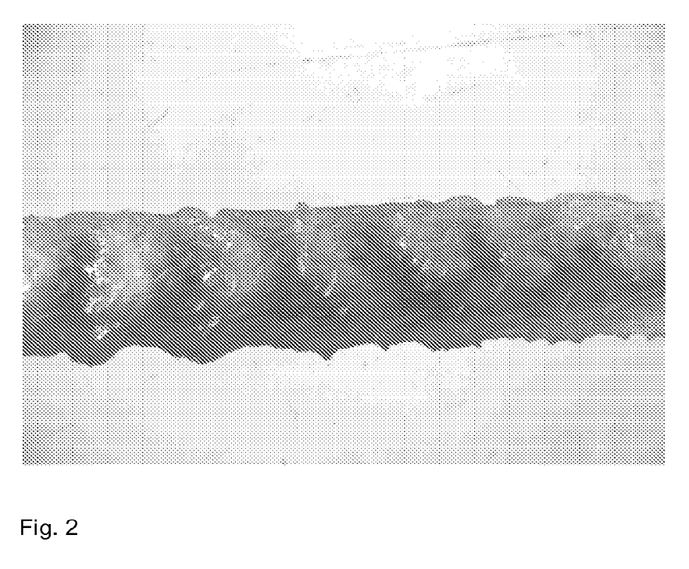
FIG. 2 shows in turn rough surface of a jacketing layer of a cable which was formed using the polymer composition of comparative example 2 (viewed under light microscope).

Surprisingly the Polymer compositions of Ex. 1, Ex. 2 and Ex. 3 can be processed more feasibly to a W&C jacketing layer than comparative samples. FIG. 1 shows very smooth surface of the cable layer which was formed from Ex. 2 of the invention, when viewed under microscopy. The polymer composition of Ex. 1 resulted in the similar layer smoothness. However, when jacketing layers were formed using polymer compositions of C.E. 1 and C.E. 2 the melt fracture phenomenon was dominating and resulted in rough surface of the layer as shown in FIG. 2 for C.E. 2.

The invention claimed is:

1. A process for producing a cable comprising:
    applying two or more layers on a conductor thereby forming the cable, wherein the two or more layers include an insulation layer and an outermost jacketing layer,
    wherein the outermost jacketing layer comprises a multimodal copolymer of ethylene with one or more comonomers and wherein the multimodal copolymer of ethylene with one or more comonomers is obtained by polymerising ethylene and one or more comonomers in the presence of a single site catalyst (SSC) and an activator for said catalyst, wherein the multimodal copolymer of ethylene has a density of less than 945 kg/m³, an Mw/Mn of 2.5 to 10, and an Mz/Mw of at least 2.45.

2. The process according to claim 1, wherein the multimodal copolymer of ethylene has the Mz/Mw of from 2.55 to 15.00.

3. The process according to claim 1, wherein the multimodal copolymer of ethylene has a shear thinning index $SHI_{2.7/210}$ of at least 7.0.

4. The process according to claim 1, wherein the multimodal copolymer of ethylene has a Mz of at least 250 000.

5. The process according to claim 1, wherein the multimodal copolymer of ethylene comprises:
   (A) from 30 to 70% by weight, based on the combined amount of components (A) and (B), of a low molecular weight (LMW) SSC derived ethylene polymer selected from ethylene homopolymer and a copolymer of ethylene and one or more alpha-olefins having from 3 to 20 carbon atoms, and
   (B) from 30 to 70% by weight, based on the combined amount of components (A) and (B), of a high molecular weight (HMW) SSC derived copolymer of ethylene and one or more alpha-olefins having from 3 to 20 carbon atoms.

6. The process according to claim 5, wherein the LMW SSC derived polymer (A) is a copolymer of ethylene with one or more alpha-olefins having from 4 to 10 carbon atoms, and the HMW SSC derived copolymer of ethylene (B) is a copolymer of ethylene with one or more alpha-olefins having from 4 to 10 carbon atoms.

7. The process according to claim 1, wherein the multimodal copolymer of ethylene comprises a low molecular weight copolymer of ethylene (A) which is obtained by polymerising ethylene in the presence of a single site catalyst (SSC) and an activator for said catalyst, and a high molecular weight copolymer of ethylene (B) which is obtained by polymerising ethylene in the presence of a single site catalyst (SSC) and an activator for said catalyst.

8. The process according to claim 1, wherein the multimodal copolymer of ethylene has at least one of the following properties:
   (i) MWD (Mw/Mn) of from 4.5 to 10.0,
   (ii) Density of from 905 to 925 kg/m$^3$,
   (iii) Flexural modulus of less than 750 MPa,
   (iv) MFR$_2$ of from 0.1 to 10.0 g/10 min, or
   (v) The multimodal copolymer of ethylene is the LMW polymer (A) which has a density of less than 945 g/m$^3$.

9. The process according to claim 8, wherein the multimodal copolymer of ethylene has all the properties (i) to (iv).

10. The process of claim 1, wherein the jacketing layer is applied by coextrusion.

11. The process according to claim 1, wherein the jacketing layer is crosslinkable.

* * * * *

UNITED STATES PATENT AND TRADEMARK OFFICE
CERTIFICATE OF CORRECTION

PATENT NO. : 10,087,296 B2
APPLICATION NO. : 14/931398
DATED : October 2, 2018
INVENTOR(S) : Carl-Gustav Ek et al.

Page 1 of 1

It is certified that error appears in the above-identified patent and that said Letters Patent is hereby corrected as shown below:

On the Title Page

Item (73) please replace the Assignee name with the following:
Assignee: BOREALIS AG, Vienna (AT)

Signed and Sealed this
Fourth Day of December, 2018

Andrei Iancu
*Director of the United States Patent and Trademark Office*